US012618930B2

(12) United States Patent　　　(10) Patent No.:　US 12,618,930 B2
Rydén et al.　　　　　　　　　　　(45) Date of Patent:　　May 5, 2026

(54) PERFORMING A HANDOVER PROCEDURE

(71) Applicant: Telefonaktiebolaget LM Ericsson (publ), Stockholm (SE)

(72) Inventors: Henrik Rydén, Stockholm (SE); Martin Isaksson, Stockholm (SE); Vijaya Yajnanarayana, Bangalore (IN); Sakib Bin Redhwan, Linköping (SE); Roman Zhohov, Linköping (SE); Maksym Girnyk, Solna (SE); Abdulrahman Alabbasi, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 760 days.

(21) Appl. No.: 17/780,887

(22) PCT Filed: Nov. 28, 2019

(86) PCT No.: PCT/SE2019/051205
§ 371 (c)(1),
(2) Date: May 27, 2022

(87) PCT Pub. No.: WO2021/107831
PCT Pub. Date: Jun. 3, 2021

(65) Prior Publication Data
US 2023/0016595 A1　　Jan. 19, 2023

(51) Int. Cl.
*H04W 52/22*　　　(2009.01)
*G01S 5/00*　　　(2006.01)
(Continued)

(52) U.S. Cl.
CPC ....... *G01S 5/0036* (2013.01); *H04W 36/0083* (2013.01); *H04W 36/322* (2023.05)

(58) Field of Classification Search
CPC ........... H04W 36/322; H04W 36/0061; H04W 36/0083; H04W 36/008357;
(Continued)

(56) References Cited

U.S. PATENT DOCUMENTS 6,714,789 B1 * 3/2004 Oh ...................... H04W 36/322
　　　　　　　　　　　　　　　　　　　　455/450
9,992,714 B1 * 6/2018 Singh .............. H04W 36/00224
(Continued)

FOREIGN PATENT DOCUMENTS

CN　　　109769280 A　　5/2019
WO　　2014/019740 A1　　2/2014
(Continued)

OTHER PUBLICATIONS

International Search Report and Written Opinion dated Sep. 14, 2020 in International Application No. PCT/SE2019/051205 (12 pages).
(Continued)

*Primary Examiner* — Phuc H Tran
(74) *Attorney, Agent, or Firm* — Rothwell, Figg, Ernst & Manbeck, P.C.

(57)　　　　　ABSTRACT

In a method in a user equipment, UE, in a communications network, of determining whether to perform a handover procedure from a first network node to a second network node, a location of the UE is provided as input to a model stored on the UE, the model having been trained using a machine learning process to predict conditions on the second network node in the communications network based on the location of the UE. A prediction of conditions on the second network node at the provided location of the UE is provided by the model. The received predicted conditions are then used to determine whether to perform a handover procedure.

17 Claims, 6 Drawing Sheets

100

Provide a location of the UE as input to a model stored on the UE, the model having been trained using a machine learning process to predict conditions on the second network node in the communications network based on the location of the UE — 102

Receive from the model a prediction of conditions on the second network node at the provided location of the UE — 104

Use the received predicted conditions to determine whether to perform a handover procedure to the second network node — 106

(51) Int. Cl.
  *H04W 36/00*     (2009.01)
  *H04W 36/32*     (2009.01)

(58) Field of Classification Search
  CPC ............ H04W 36/00837; H04W 36/32; G01S
    5/0036; G06N 20/10; G06N 20/20; G06N
    3/045; G06N 5/01
  See application file for complete search history.

(56)                  References Cited

U.S. PATENT DOCUMENTS

| | | | |
|---|---|---|---|
| 11,968,587 B2 * | 4/2024 | Sun ................... | H04W 36/0058 |
| 2012/0258718 A1 * | 10/2012 | Whinnett ............ | H04W 84/045 |
| | | | 455/437 |
| 2013/0208696 A1 * | 8/2013 | Garcia Martin .... | H04W 36/322 |
| | | | 370/331 |
| 2014/0355565 A1 | 12/2014 | Hayes et al. | |
| 2015/0038143 A1 * | 2/2015 | Kilpatrick, II ........ | H04W 36/04 |
| | | | 455/436 |
| 2016/0183071 A1 * | 6/2016 | Shinada ................ | H04W 76/10 |
| | | | 455/456.3 |
| 2016/0381627 A1 | 12/2016 | Kozat et al. | |
| 2017/0325140 A1 | 11/2017 | Da Silva et al. | |
| 2019/0075499 A1 * | 3/2019 | Izui ..................... | H04W 36/322 |
| 2019/0104458 A1 | 4/2019 | Svennebring et al. | |
| 2019/0138934 A1 | 5/2019 | Prakash et al. | |
| 2019/0159102 A1 | 5/2019 | Ryu et al. | |

FOREIGN PATENT DOCUMENTS

| | | |
|---|---|---|
| WO | 2018113921 A1 | 6/2018 |
| WO | 2019/098910 A1 | 5/2019 |
| WO | 2019/139510 A1 | 7/2019 |
| WO | 2019/172813 A1 | 9/2019 |

OTHER PUBLICATIONS

3GPP Tdoc RP-191080, ZTE's View on Rel-17, ZTE 5G Solution, May 27, 2019 (37 pages).

Oppo et al., "New WID on Study on traffic characteristics and performance requirements for AI/ML model transfer in 5GS", S1-193606, 3GPP TSG-SA WG1 Meeting #88, Reno, Nevada, USA, Nov. 18-22, 2019, XP051831339 (3 pages).

\* cited by examiner

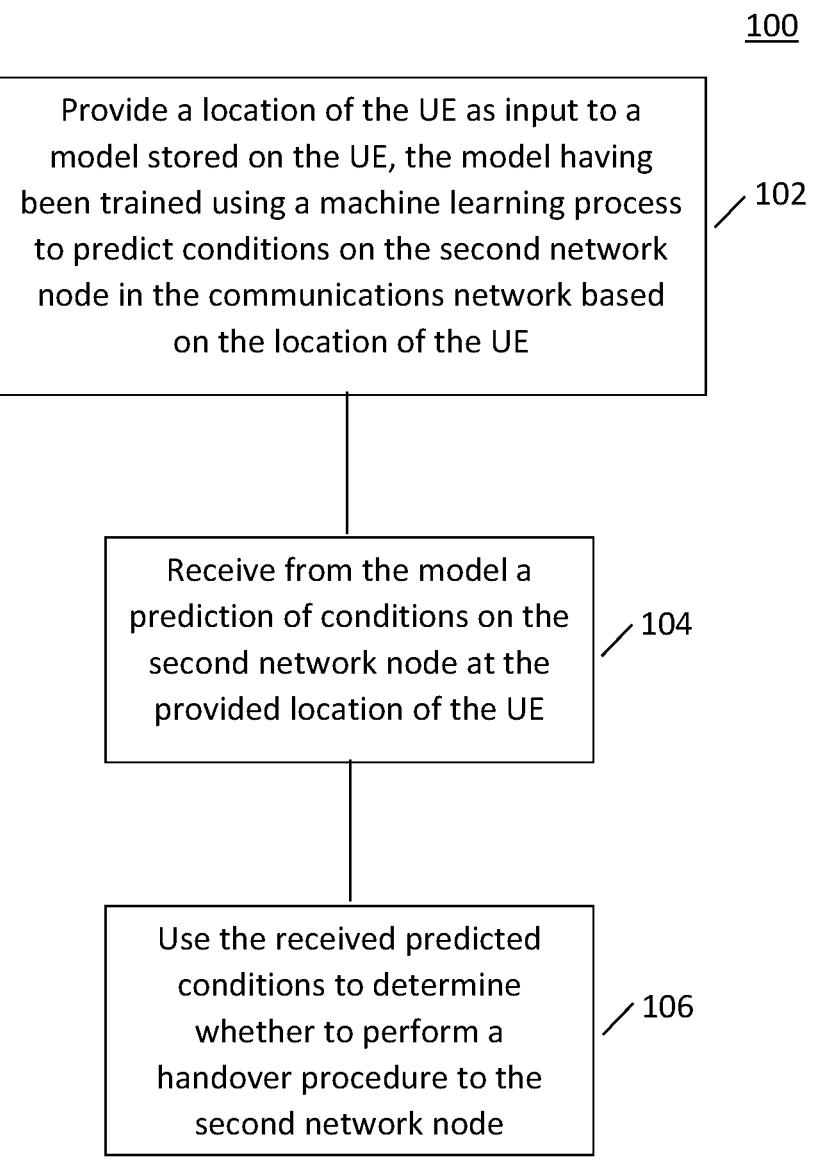

100

Provide a location of the UE as input to a model stored on the UE, the model having been trained using a machine learning process to predict conditions on the second network node in the communications network based on the location of the UE — 102

Receive from the model a prediction of conditions on the second network node at the provided location of the UE — 104

Use the received predicted conditions to determine whether to perform a handover procedure to the second network node — 106

Fig. 1

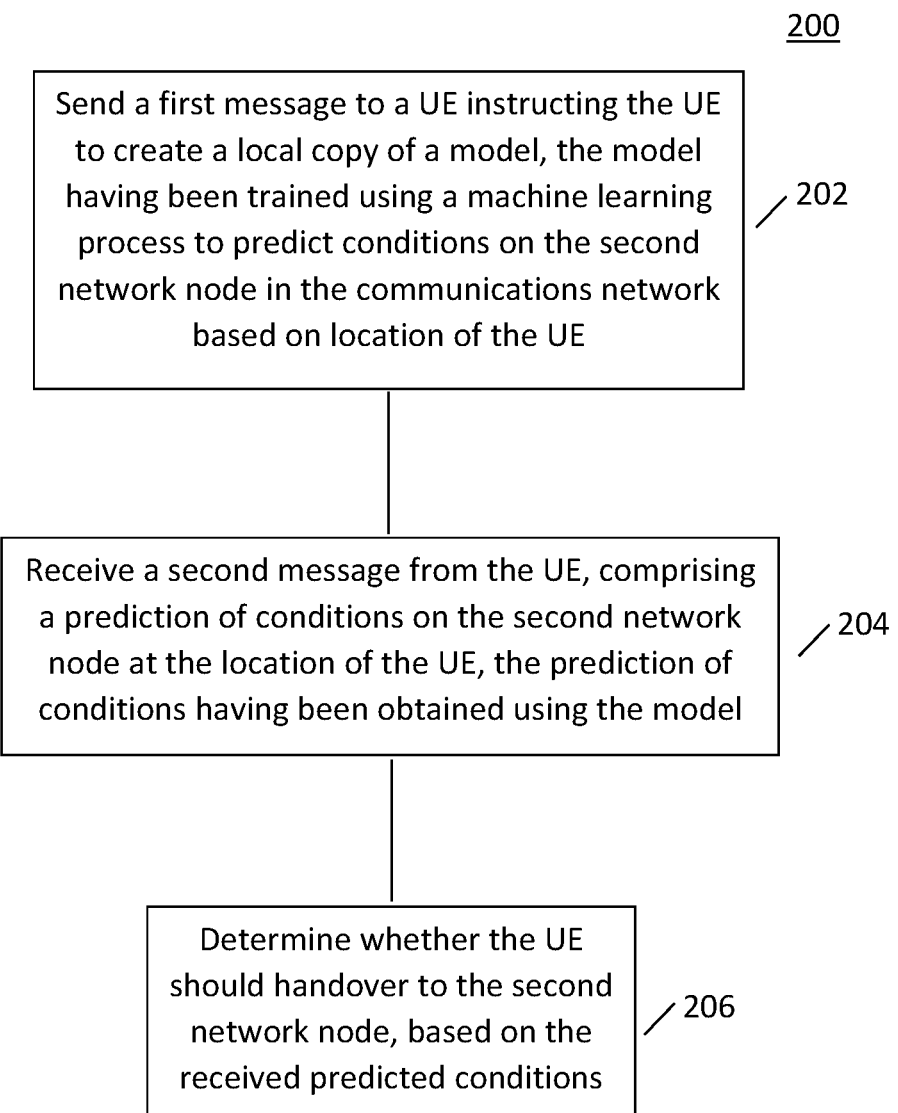

200

Send a first message to a UE instructing the UE to create a local copy of a model, the model having been trained using a machine learning process to predict conditions on the second network node in the communications network based on location of the UE          202

Receive a second message from the UE, comprising a prediction of conditions on the second network node at the location of the UE, the prediction of conditions having been obtained using the model          204

Determine whether the UE should handover to the second network node, based on the received predicted conditions          206

Fig. 2

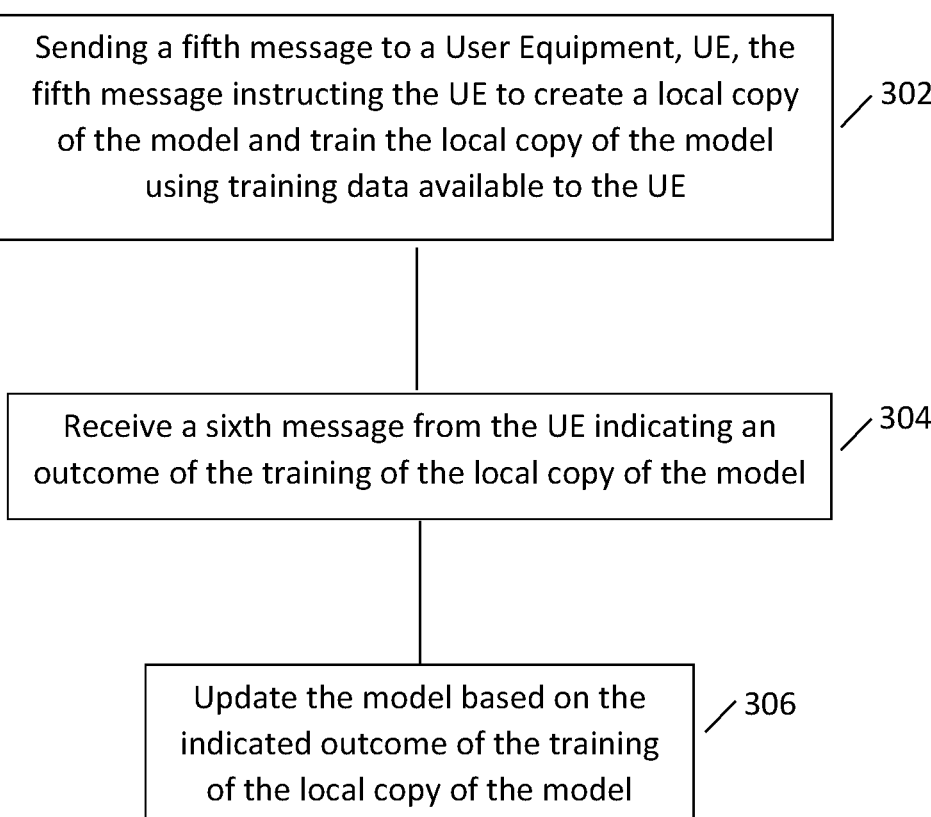

300

Sending a fifth message to a User Equipment, UE, the fifth message instructing the UE to create a local copy of the model and train the local copy of the model using training data available to the UE — 302

Receive a sixth message from the UE indicating an outcome of the training of the local copy of the model — 304

Update the model based on the indicated outcome of the training of the local copy of the model — 306

PERFORMING A HANDOVER PROCEDURE

CROSS REFERENCE TO RELATED APPLICATION(S)

This application is a 35 U.S.C. § 371 National Stage of International Patent Application No. PCT/SE2019/051205, filed Nov. 28, 2019.

TECHNICAL FIELD

This disclosure relates to methods, nodes and systems in a communications network. More particularly but non-exclusively, the disclosure relates to handover procedures in a communications network.

BACKGROUND

Disclosures herein relate to communications networks such radio access networks. More specifically, disclosures herein relate to handover from a first node to a second node in a communications network.

The number of subscribers (e.g. user equipment and devices) is ever increasing on communications networks. Furthermore, the performance requirements of said subscribers are also increasing. As such, there is a need for better coordination in communication networks to ensure good resource usage. If, for instance, certain nodes of the network are over-crowded, serving many users, while other nodes are underutilized, this can lead to unutilized network capacity since the crowded node, which has only a portion of the total network capacity, may limit its users when they could otherwise have been handed over to an underutilized node.

It is thus an object of the disclosures herein to provide improved handover of a user equipment between different nodes in a communications network.

SUMMARY

Handover typically involves a user equipment (UE) having to perform inter-frequency measurements to determine an appropriate node to connect to. This can require the UE to reconfigure its receive chain to a different frequency carrier from that of the source cell, unless the UE can support multiple receive chains that can measure simultaneously on several frequency carriers. In the former case, the UE is not able to communicate with the source cell whilst making measurements on the new frequency carrier. Furthermore, both scenarios require increased UE battery consumption. With the deployment of mmWave driven by 5G, the number of carriers that a UE can be served by is increasing and finding the best carrier for a UE can thus require a substantial number of inter-frequency measurements to be made by the UE.

One possible solution to this problem comprises using machine learning models to predict conditions on one or more possible nodes to which the UE could handover to, based on measurements of conditions associated with one or more other nodes (e.g. target carrier prediction). However, the use of target carrier prediction in this manner still requires frequent measurement of source carrier information, and in general, the target carrier predictions increase in accuracy with increased source carrier information, incentivizing measuring conditions on as many frequencies as possible. Source carrier information can comprise measurements on neighboring nodes, thus also requiring a large measurement overhead for the UE.

The use of other input parameters, such as UE location, come with complications as, due to the sensitive type of location data, locations are not commonly reported to the network except for in emergency situations, or in specific commercial use cases, and can thus not be explored for building network decision functions that requires or can benefit from frequent location information such as intra/inter-freq. handover.

It is an object of the embodiments herein to provide improved handover procedures that require fewer inter-frequency measurements to be made and thus consume less battery power.

According to a first aspect herein there is a method in a user equipment, UE, in a communications network of determining whether to perform a handover procedure from a first network node to a second network node. The method comprises providing a location of the UE as input to a model stored on the UE, the model having been trained using a machine learning process to predict conditions on the second network node in the communications network based on the location of the UE, receiving from the model a prediction of conditions on the second network node at the provided location of the UE, and using the received predicted conditions to determine whether to perform a handover procedure to the second network node.

In some embodiments the model was trained using a federated machine learning process.

Predicting conditions on the second network node based on the location of the UE requires the UE to make fewer inter-frequency measurements, saving battery power whilst still providing a reliable prediction of conditions on the second network node. Furthermore, the use of a model trained using a Federated machine learning process ensures that the UE location is not transmitted across the network in order to train or use the model for the prediction. This ensures data privacy of UE location data.

According to a second aspect there is a method in a node of a communications network of determining whether to instruct a user equipment, UE to perform a handover procedure from a first network node to a second network node. The method comprises sending a first message to a UE, the first message instructing the UE to create a local copy of a model, the model having been trained using a machine learning process to predict conditions on the second network node in the communications network based on location of the UE, receiving a second message from the UE, comprising a prediction of conditions on the second network node at the location of the UE, the prediction of conditions having been obtained using the model, and determining whether the UE should handover to the second network node, based on the received predicted conditions.

According to a third aspect there is a method in a user equipment, UE, in a communications network, of training a model using a federated machine learning process to predict conditions on one or more network nodes in the communications network, the predicted conditions being for use in a handover procedure. The method comprises receiving a fifth message from a node in the communications network, the first message instructing the UE to create a local copy of the model and train the local copy of the model using training data available to the UE, wherein the training data comprises i) example inputs comprising indications of locations of the UE and ii) for each example input a corresponding example output comprising a ground truth condition on each of the one or more nodes at the respective indicated input location as measured by the UE. The method further comprises training the local copy of the model according to the received fifth message, and sending a sixth message to the node indicating an outcome of the training of the local copy of the model, such that the node may update a central version of the model, based on the training of the local copy.

According to a fourth aspect there is a method in a node of a communications network for training a model using a federated machine learning process to predict conditions on one or more network nodes in the communications network, the predicted conditions being for use in a handover procedure. The method comprises sending a fifth message to a User Equipment, UE, the fifth message instructing the UE to create a local copy of the model and train the local copy of the model using training data available to the UE, wherein the training data comprises i) example inputs comprising indications of locations of the UE and ii) for each example input a corresponding example output comprising a ground truth condition on each of the one or more network nodes at the respective indicated input location as measured by the UE, receiving a sixth message from the UE indicating an outcome of the training of the local copy of the model, and updating the model based on the indicated outcome of the training of the local copy of the model.

According to a fifth aspect, there is a user equipment, UE, in a communications network, the UE being configured to determine whether to perform a handover procedure from a first network node to a second network. The UE comprises: a memory comprising instruction data representing a set of instructions and a processor configured to communicate with the memory and to execute the set of instructions. The set of instructions, when executed by the processor, cause the processor to: provide a location of the UE as input to a model stored on the UE, the model having been trained using a machine learning process to predict conditions on the second network node in the communications network based on the location of the UE; receive from the model a prediction of conditions on the second network node at the provided location of the UE; and use the received predicted conditions to determine whether to perform a handover procedure to the second network node.

According to a sixth aspect there is a node in a communications network the node being configured to determine whether to instruct a user equipment, UE to perform a handover procedure from a first network node to a second network node. The node comprises a memory comprising instruction data representing a set of instructions and a processor configured to communicate with the memory and to execute the set of instructions. The set of instructions, when executed by the processor, cause the processor to: send a first message to a UE, the message instructing the UE to create a local copy of a model, the model having been trained using a machine learning process to predict conditions on the second network node in the communications network based on location of the UE; receive a second message from the UE, comprising a prediction of conditions on the second network node at the location of the UE, the prediction of conditions having been obtained using the model; and determine whether the UE should handover to the second network node, based on the received predicted conditions.

According to a seventh aspect there is a node in a communications network, the node being suitable for training a model using a federated machine learning process to predict conditions on one or more network nodes in the communications network, the predicted conditions being for use in a handover procedure. The node comprises: a memory comprising instruction data representing a set of instructions and a processor configured to communicate with the memory and to execute the set of instructions. The set of instructions, when executed by the processor, cause the processor to: send a fifth message to a User Equipment, UE, the fifth message instructing the UE to create a local copy of the model and train the local copy of the model using training data available to the UE, wherein the training data comprises i) example inputs comprising indications of locations of the UE and ii) for each example input a corresponding example output comprising a ground truth condition on each of the one or more network nodes at the respective indicated input location as measured by the UE; receive a sixth message from the UE indicating an outcome of the training of the local copy of the model; and update the model based on the indicated outcome of the training of the local copy of the model.

According to an eighth aspect there is a user equipment, UE, in a communications network the UE being suitable for training a model using a federated machine learning process to predict conditions on one or more network nodes in the communications network, the predicted conditions being for use in a handover procedure. The user equipment comprises a memory comprising instruction data representing a set of instructions and a processor configured to communicate with the memory and to execute the set of instructions. The set of instructions, when executed by the processor, cause the processor to: receive a fifth message from a node in the communications network, the fifth message instructing the UE to create a local copy of the model and train the local copy of the model using training data available to the UE, wherein the training data comprises i) example inputs comprising indications of locations of the UE and ii) for each example input a corresponding example output comprising a ground truth condition on each of the one or more nodes at the respective indicated input location as measured by the UE; train the local copy of the model according to the received fifth message; and send a sixth message to the node indicating an outcome of the training of the local copy of the model, such that the node may update a central version of the model, based on the training of the local copy.

According to a ninth aspect there is a computer program product comprising a computer readable medium, the computer readable medium having computer readable code embodied therein, the computer readable code being configured such that, on execution by a suitable computer or processor, the computer or processor is caused to perform the method as in any one of the embodiments of the first, second, third or fourth aspects.

BRIEF DESCRIPTION OF THE DRAWINGS

For a better understanding and to show more clearly how embodiments herein may be carried into effect, reference will now be made, by way of example only, to the accompanying drawings, in which:

FIG. 1 shows an example method in a UE according to some embodiments;

FIG. 2 shows an example method in a node according to some embodiments;

FIG. 3 shows an example method in a node according to some embodiments;

DETAILED DESCRIPTION

Figure 4:
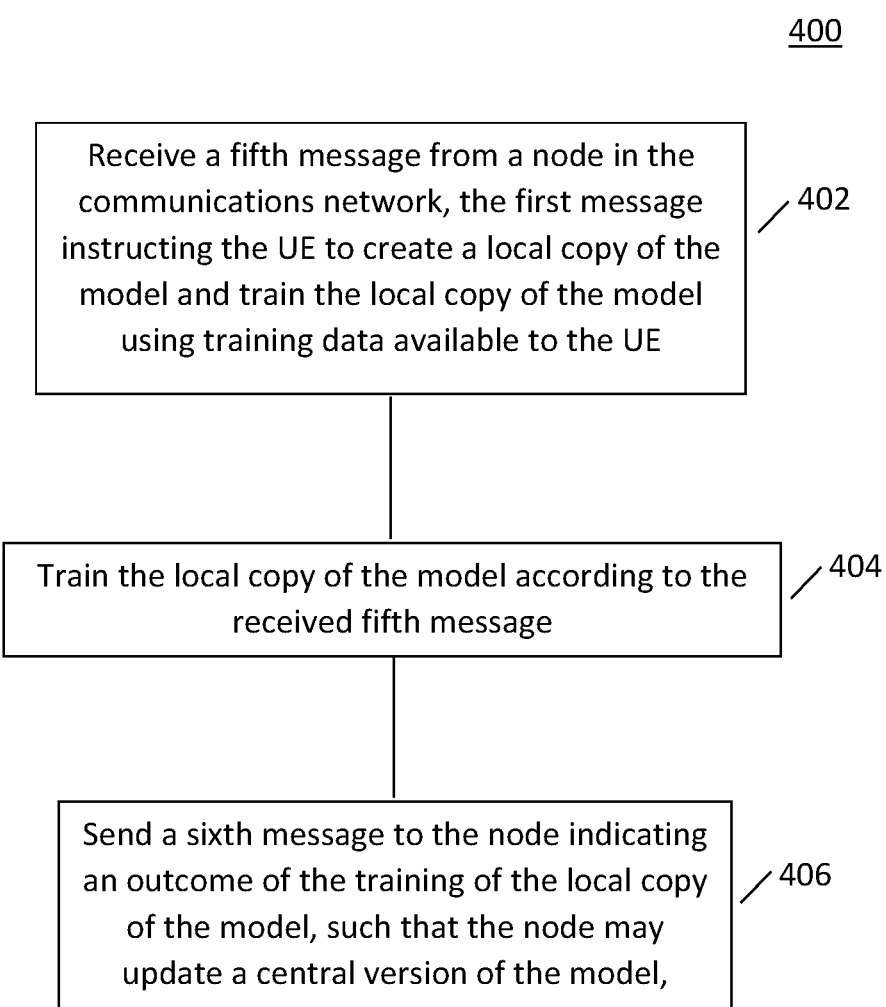
FIG. 4 shows an example method in a UE according to some embodiments.

As described above, handover procedures typically require a user equipment to perform measurements on different network nodes to determine whether the UE should perform a handover procedure. Amongst other issues, this may require a lot of battery power and signaling overhead. Other methods may use prediction algorithms, however the inputs to such prediction algorithms may comprise sensitive information (such as UE location). There is thus a need for improved, privacy compliant handover.

It is therefore proposed in embodiments herein that a UE uses a model trained using a federated machine learning process to predict the conditions on possible alternative network nodes that the UE could connect to, based on the UE's location. As will be described in more detail below, the use of federated learning enables the model to be trained using data from a wide range of UEs at different locations without the UE location data needing to be transmitted to a central server during training and execution of the model. The location data can be kept private, whilst still providing a robustly trained model.

In this way, there is provided a method of using federated learning to enable the use of user-sensitive (e.g. private) data for handover. Each UE updates a local model based on its local data and shares the local model with the network. The network aggregates the local models or updates to the local models into a central model, effectively combining all of the learning performed by each UE. Only the model parameters are sent around the network; the training data stays on the UE that collected it.

FIG. 1 shows an example method 100 in a UE according to some embodiments herein. The method 100 shows an example of how a model (e.g. trained using a federated machine learning procedure) may be used in a handover procedure. The method 100 is for determining whether to perform a handover procedure from a first network node to a second network node. Briefly, in a first block 102, the method comprises providing a location of the UE as input to a model stored on the UE, the model having been trained using a machine learning process to predict conditions on the second network node in the communications network based on the location of the UE. In a second block 104, the method comprises receiving from the model a prediction of conditions on the second network node at the provided location of the UE. In a third block 106, the method comprises using the received predicted conditions to determine whether to perform a handover procedure to the second network node.

In more detail, a user equipment may comprise any device capable, configured, arranged and/or operable to communicate wirelessly with network nodes and/or other wireless devices. Examples of a UE include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. Generally, a UE may comprise a UE 600 as described below with respect to FIG. 6.

The communications network (or telecommunications network) may comprise any one, or any combination of: a wired link (e.g. ASDL) or a wireless link such as Global System for Mobile Communications (GSM), Wideband Code Division Multiple Access (WCDMA), Long Term Evolution (LTE), WiFi, or Bluetooth wireless technologies. The skilled person will appreciate that these are merely examples and that the communications network may comprise other types of links.

The method 100 is for use in determining whether to perform a handover procedure from a first network node to a second network node.

The first and second network nodes may comprise equipment capable, configured, arranged and/or operable to communicate directly or indirectly with a device (such as a wireless device of user equipment) and/or with other network nodes or equipment in the communications network to enable and/or provide wireless or wired access to the device and/or to perform other functions (e.g., administration) in the communications network. Generally, the first and second network nodes may operate on the same or different carriers as the UE.

Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC), such as Access and Mobility Management function (AMF), Session Management function (SMF) and Network Slice Selection Function (NSSF).

In block 102 of the method 100, the method comprises providing a location of the UE as input to a model stored on the UE, the model having been trained using a machine learning process to predict conditions on the second network node in the communications network based on the location of the UE. As such, the model comprises a local model, stored on the UE. In this way the UE does not have to send private location data across the network.

The skilled person will be familiar with machine learning and different types of models that can be trained, for example using training data, to take as input a location of a UE and output a prediction of conditions on a network node in the communications network.

In some embodiments, the model may comprise a neural network. The model may comprise a trained neural network, such as a feed-forward, convolutional, echo state network, support vector machine, or recurrent neural networks. The skilled person will be familiar with neural networks, but in brief, neural networks are a type of supervised machine learning model that can be trained to predict a desired output for given input data. Neural networks are trained by providing training data comprising example input data and the corresponding "correct" or ground truth outcome that is desired. Neural networks comprise a plurality of layers of neurons, each neuron representing a mathematical operation that is applied to the input data. The output of each layer in the neural network is fed into the next layer to produce an output. For each piece of training data, weights associated with the neurons are adjusted (e.g. using a loss function and gradient descent) until the optimal weightings are found that produce predictions for the training examples that reflect the corresponding ground truths.

Although the examples described herein are given with respect to neural networks, it will be appreciated that the principles herein apply equally to any other model that can be trained using a machine learning process to take a location as input and output a prediction of conditions on the second node. For example, the model may comprise a model trained using a supervised machine learning process. Examples of other models include, but are not limited to decision trees, nearest neighbor models, random forest models and genetic algorithms. In other embodiments a reinforcement learning model may be used.

As will be described in more detail below, the model may have been trained using training data comprising i) example input location data and ii) corresponding ground truth conditions on the second node. The skilled person will be familiar with methods of training a neural network using training data (e.g. gradient descent etc.). It will be further appreciated that the model may have other input and/or output channels. For example, the model may be trained to take as input one or more measurements of conditions on the second node. The model may further output a prediction of conditions on one or more other nodes (in addition to the second node), based on the location of the UE.

Generally, the model may have been trained using a federated machine learning process. The model may have been trained according to the methods 300 or 400 as described below with respect to FIGS. 3 and 4. The use of Federated machine learning to train the model ensures that training data comprising sensitive UE location data is not transmitted across the network—rather the training data is used to train the model on the UE that the training data pertains to.

The model may have been signaled to the UE as part of the training of the model, in which case the UE may use the (most up to date) model from the training phase. Alternatively, the UE may receive the model, or parameters that enable the UE to create the model, from a node in the network.

Returning to block 102, the UE may determine its location and provide this to the model. The capabilities of UEs in estimating their location are increasing due to the popularization of smartphones that typically are equipped with a Global Navigation Satellite System (GNSS) receiver. Also, with the standardization of new radio (NR), one topic in the Rel. 16 standardization is UE positioning, where decimeter accuracy is one of the target requirements. Such accuracy allows for provision of a more accurate model because as the granularity of the location data used to train the model (training data) increases, so can the discriminatory power of the model.

It is noted that the use of Federated learning enables more accurate geo-location information to be used, compared to location information available to the network e.g. Cell-ID based methods (which depend on the coverage range of the node). The GPS-accuracy is in order of meters, while the cell-id is in order of the inter-site distance (100 s of meters). Thus, the UE does not need to reveal sensitive data to the network, but still can use a model trained using the sensitive data from other devices to improve network handover.

Geo-location at the device can be retrieved, for example, by Global Navigation Satellite System, GNSS. Reading GNSS measurements can require extra energy at the device, however, in deployments with high number of carriers (even more are expected with NR) such as dense Asian cities, measuring on GNSS in combination with the invention can be more efficient than performing inter-frequency measurements on all possible carriers. Also, GNSS might already be available for other use cases such as navigation, thus there may be no additional overhead associated with the use of methods herein. Moreover, better load-balancing can save network energy since the UE is served by the best frequency and finding the best frequency faster can reduce the UE latency.

In block 104, the model provides a prediction of conditions on the second network node at the location provided by the UE. The predicted conditions (e.g. the output of the model) may comprise, for example, any one or more of: a signal strength of a reference signal from a specific node; the strongest signal strength on any reference signal on a carrier; a signal to interference ratio; the best carrier index (carrier with strongest signal strength); the best node index (strongest cell or beam at one or more carriers). The predicted conditions are then used to determine whether to perform a handover procedure to the second network node.

In some embodiments, the UE may determine, based on the predicted conditions, whether to perform the handover procedure. Put another way, the method 100 may comprise performing a handover procedure to the second network node based on the received prediction of the conditions on the second network node at the provided location of the UE.

In other embodiments, the UE may send a message (e.g. report) comprising the predicted conditions to a node in the communications network for the node to determine whether the UE should perform the handover procedure. For example, the step of using the received predicted conditions to determine whether to perform a handover may comprise the UE sending a second message comprising the received predicted conditions to a node in the communications network for use by the node in determining whether the UE should perform a handover procedure to the second network node.

In some examples, the UE may use a reporting criterion that describes how or when to trigger a report to the network. As such, in some embodiments, the method 100 may further comprise the UE comparing the received predicted conditions on the second network node to a reporting condition and sending the second message (e.g. a message to the node comprising the predicted conditions) if the received predicted conditions on the second network node satisfy the reporting condition.

The reporting condition may take different forms, for example, the reporting condition may comprise a threshold whereby the reporting condition is satisfied if the received predicted conditions change from being below the threshold to above the threshold, or if the received predicted conditions change from being above the threshold to below the threshold. The threshold may comprise a threshold signal strength on the second network node, as such, the reporting condition may be satisfied if the received predicted conditions indicate that the signal strength on the second network node is above the threshold signal strength.

In summary, one criterion could be to report when the output of the model (e.g. the predicted conditions) changes, for example, if the model output changes from 0->1 or vice versa. Or a coverage threshold on a secondary carrier could be used to trigger an inter-frequency handover to said carrier. The criteria could also comprise a threshold, whereby the UE reports when the model output is above or below the threshold.

The reporting criteria may also be based on the UE local environment. For example, a secondary carrier reaching a threshold and the UE load, or interference, or signal quality, reaching a certain threshold. For example, the reporting condition may comprise a threshold load on the UE and wherein the reporting condition is satisfied if the load on the UE is above the threshold load. As such, the UE may report to the node more frequently when the UE experiences high load, or the conditions on the first node are insufficient for the UE's requirements. In another example, a UE may report the drift of the predicted signal to a certain threshold value, as indicated by the network.

Turning to FIG. 2, FIG. 2 illustrates an example method 200 in a node according to some embodiments herein. The method is for determining whether to instruct a user equipment, UE to perform a handover procedure from a first network node to a second network node. Different types of nodes were described above with respect to the first node and the second node and it will be understood that these node types apply equally to the node performing the method 200. In some embodiments, the node performing the method 200 may be deployed in the cloud. It could also be the node that is serving the UE.

Briefly, the method comprises in a first block 202 sending a first message to the UE, the message instructing the UE to create a local copy of a model, the model having been trained using a machine learning process to predict conditions on the second network node in the communications network based on location of the UE.

The model e.g. the first message comprising the model, may be signaled to the UE via RRC in LTE/NR. It could also be signaled using broadcast, in for example the System information block, or by multicast. The first message may comprise information such as configuration information that can be used by the UE to create a local copy of the model on the UE. The format and contents of such a message are described in detail below with respect to block 302 below.

In a second block 204 the method comprises receiving a second message from the UE, comprising a prediction of conditions on the second network node at the location of the UE, the prediction of conditions having been obtained using the model. the second message was described above with respect to method 100 and the detail therein will be understood to apply equally to the method 200.

In a third block 206 the method comprises determining whether the UE should handover to the second network node, based on the received predicted conditions. The skilled person will be familiar with decision making processes with which to determine whether a UE should perform a handover procedure, based on condition(s) on a second node, and these will be understood to apply to block 206.

If the node determines that the UE should perform the handover procedure, the node may send a third message to the UE to instruct the UE to handover to the second network node, in the normal manner. As noted above, because the model is created on the UE, the node does not receive the UE location, thus maintaining the UE privacy.

Turning now to the manner in which the model is trained, FIG. 3 illustrates an example method 300 in a node of a communications network for training a model using a federated machine learning process to predict conditions on one or more network nodes in the communications network, the predicted conditions being for use in a handover procedure. Briefly, the method 300 comprises in a first block 302, sending a fifth message to a User Equipment, UE, the fifth message instructing the UE to create a local copy of the model and train the local copy of the model using training data available to the UE, wherein the training data comprises i) example inputs comprising indications of locations of the UE and ii) for each example input a corresponding example output comprising a ground truth condition on each of the one or more network nodes at the respective indicated input location as measured by the UE. In a second block 304, the method comprises receiving a sixth message from the UE indicating an outcome of the training of the local copy of the model. In a third block 306 the method comprises updating the model based on the indicated outcome of the training of the local copy of the model.

Put another way, from the node perspective, the training comprises sending details of a central copy or "global" model to a plurality of UEs in order for the UE to create and train a local copy of said model, receiving updated models from the UEs, combining the updates into "global" or central copy of the model. The node may then send the updated model to the UEs, or continue to the execution phase, for example based on the number of training iterations.

Federated Learning in this manner is used in order to limit the need to store (and send) sensitive data. Federated learning is a technique that allows users to collectively use the advantages of shared models trained from multiples users, without needing to exchange the sensitive raw data and/or store such data on a central server. In a system that adopts federated learning, each user has a local training dataset which does not need to be uploaded to the server. Instead, each user computes an update to the current global model, and only this update is communicated to the server. Federated learning enables users to leverage the benefits of shared models trained from a large, distributed data without the need of sharing the data to a central entity.

In more detail, in block 302, the fifth message may comprise information relating to the model. The information may allow the UE to create a local copy of the model on the UE. For example, the fifth message may comprise an indication of the type of model, an indication of the input parameters and output parameters of the model, an indication of values for one or more weights of the model and/or any other parameters related to the model. The structure of the ML model may also be signaled to the UE. In embodiments where the model comprises a neural network, this may include, for example, the configuration of layers/neurons in a neural network, and/or the weights of each layer. The format for a neural network may comprise a model format from an open source toolbox. Examples of open source toolboxes include, but are not limited to torch, Keras, or the ONNX open source format. In the first iteration, the fifth message may indicate an untrained model e.g. with random initialization weights.

To improve the efficiency of the model reporting, the UE/network nodes can in some embodiments only report weights larger than a predefined threshold T. In some embodiments, model weights may be quantized into 8,16, or 32-bit representation in order to reduce the signaling overhead.

As noted above with the fifth message may comprise an indication of the input parameter(s) to the model and/or the format of such input parameters. For example, an input parameter may comprise the geo-location. The fifth message may further comprise the format that is to be used, for example, whether it should be in longitude/latitude and altitude information, or converted into an 2d or 3d angle plus the distance to a reference location signaled in the model information. The reference location could for example be the serving node or second node location. The reference location can in another embodiment be preconfigured at the UE.

In addition, the fifth message to the UE from the node may provide an indication of the desired output of the model, in order to instruct the UE to train the model according to f(location)=>output. The output comprises an indication of a condition on the second node. for example, any one or any combination of: signal strength of a reference signal from a specific node; the strongest signal strength on any reference signal on a carrier; a signal to interference ratio; the best carrier index (carrier with strongest signal strength); the best node index (strongest cell or beam at one or more carriers).

In some embodiments, the UE may be instructed to train the local copy of the model to predict the conditions on the second node and the conditions on the second carrier frequency based on an indicated input location. In other words, there may be other model outputs in addition to the conditions on the second node. In such embodiments, the training data further comprises, for each example input a corresponding example output comprising a ground truth condition on a second carrier frequency at the respective indicated input location as measured by the UE.

In addition, the UE may be configured with (e.g. the fifth message to the UE from the node may provide an indication of) a training configuration. A training configuration may comprise: a number of samples to train before feedback to the serving node. In embodiments where the model comprises a neural network, a training configuration may comprise a learning rate and batch size in training the neural network; an optimizer for use when training the neural network, for example, stochastic gradient descent, or Adam optimizer.

In block 304 the node receives a sixth message comprising an indication of an outcome of the training performed by the UE on the local copy of the model. The indication of an outcome may comprise, for example, an indication of an update or updates to the weights of a neural network. The indication of the outcome of the training (e.g. the feedback) can comprise updates to any of the model parameters that were sent to the UE, e.g. in the fifth message.

Other examples of parameters that may be comprised in the sixth (or other) messages include, but are not limited to: an indication of the number of samples used by the UE to train the local copy of the model, an indication of a loss associated with the training performed on the local copy of the model, for example a mean squared error of the predicted output versus the true output.

In block 306, the node updates the model (e.g. the global or central copy of the model stored on the node) based on the updates received from the UE. For example, an average value for each weight in the model may be determined from the reported outcomes of the training performed by each UE. This is merely an example however and the skilled person will be familiar with different ways that training updates or insights from a plurality of devices may be combined (e.g. aggregated or incorporated) into a central copy of a model according to a Federated learning procedure.

The steps of sending, receiving and updating (e.g. blocks 302, 304 and 306) may be repeated for a plurality of UEs. The node may then combine all of the training outcomes into its copy of the model (e.g. the central or global model).

The node may further, e.g. after updating the central copy of the model with a first round of updates from one or more UEs, repeat the steps of sending, receiving and updating (e.g. blocks 302, 304 and 306) for the updated model.

Generally, if further training is required, the node may send a fourth message to the UE, instructing the UE to perform further training on the model according to the federated machine learning procedure.

The node may determine whether to perform more training, or whether enough training has already occurred, based on, for example, the number of received model updates, the total number of received training samples, and/or the received Loss values from UEs during the training phase.

The node may determine that a particular UE should cease or stop performing training on its local copy of the model.

For example, if i) the node has performed more than N model updates; ii) a number of training examples used by the UE exceeds a threshold sample size; and/or iii) a measure of received losses are lower than a predefined loss threshold. More generally, the node may determine that a UE should cease training of the model if the updates received from that UE indicate that the training performed by that UE is converging. The node may then send a seventh message to the UE to indicate that the UE should cease to train the local copy of the model.

An example method 400 from the perspective of the UE is illustrated in FIG. 4. The method 400 is for training a model using a federated machine learning process to predict conditions on one or more network nodes in the communications network. The predicted conditions are for use in a handover procedure. Briefly, in block 402 the method comprises receiving a first message from a node in the communications network, the fifth message instructing the UE to create a local copy of the model and train the local copy of the model using training data available to the UE, wherein the training data comprises i) example inputs comprising indications of locations of the UE and ii) for each example input a corresponding example output comprising a ground truth condition on each of the one or more nodes at the respective indicated input location as measured by the UE. In block 404, the method 400 comprises training the local copy of the model according to the received fifth message. In block 406 the method then comprises sending a sixth message to the node indicating an outcome of the training of the local copy of the model, such that the node may update a central version of the model, based on the training of the local copy.

The fifth message and the sixth message were described in detail with respect to blocks 302 and 304 of method 300 and the detail will be understood to apply equally to blocks 402 and 406 herein.

With respect to block 404, the UE may collect training data (e.g. it may determine its location and make ground truth measurements of the conditions on the second node).

As an example, in an embodiment where the model takes as input the location and outputs a signal to noise ratio (SNR) on the second node, the training data collected by the UE may be in the following format:

Location: The location can comprise the longitude/latitude coordinates. The location can also comprise height information, comprising the distance above the sea-level.

SNR: Is the signal power divided by the noise power, measured in dB scale.

Two examples given a long/latitude representation and no height information of the location, and SNR in Db scale could comprise, ((long,lat)->SNR), (55.740000, 14.250000)->10 dB
(55.750000, 14.260000)->0 dB In such an example the SNR represents the ground truth, e.g. the SNR that the UE actually measures on the second node at the location. The model is thus trained to predict the field: SNR from the input parameter: Location. The skilled person will be familiar with method of training a model, such as a neural network model and the training in block 404 may be performed using any training method (e.g. using a loss function, gradient descent etc.). As noted above, the method 400 may comprise indicating an outcome of the training of the local copy of the model in an 8, 16 or 32 bit representation, in order to reduce signalling overhead.

In some embodiments, the methods 300 and 400 may be performed online. Put another way, further training may be performed while an earlier version of the model is in use.

The node may continue to update the UE model even while running the execution phase, in order to update the model in response to factors such as, for example, environmental changes, neighbor events, social event, channel fluctuation, or fluctuation on loads on target and neighbor cells.

Generally, in the training phase, there are not stringent constraints on updating the model, due to flexible time and bandwidth. However, when operating in online, or execution mode, cells may be fully loaded, and a decision on whether to handover e.g. to a second node may need to be made more quickly. As such, there may be latency requirements in order to provide model convergence.

As such, in order to ensure that the model and/or model updates are sent over the communications network efficiently (and to meet the aforementioned latency requirements), the node may determine one or more network layers of the communications network over which to send the configuration of the model, based on a size of the model and/or a latency requirement for the model transfer.

It will be understood that the node and/or UE may determine to send the model, or indications of updates to the model across different layers whenever such information needs to be exchanged between the node and the UE. For example, the embodiments described in this section may apply equally to blocks 202 of method 200; 302 or 304 of method 300; and/or blocks 404 and 406 of the method 400.

In some examples, if a large model, or large model update needs to be sent over the communication network quickly, the node may enable all layers model transfer mode, i.e., PHY+MAC+RLC+PDCP+Application. Put another way, the node may determine to send the (model) configuration to the UE using all available network layers if the model is greater than a first threshold model size and/or if the latency required for the model transfer is less than a first threshold latency.

In some examples, if a small model, or small model update needs to be sent across the communications network quickly, the node may enable PHY layer model transfer with mini-slot. Put another way, the node may determine to send the (model) configuration to the UE using a physical, PHY, network layer if the model is less than a second threshold model size and/or if the latency required for the model transfer is less than a second threshold latency.

In some examples, if a small model, or small model update needs to be sent across the communications network, without urgency (e.g. slow transfer is acceptable), the node may enable application layer model transfer. Put another way, the node may determine to send the (model) configuration to the UE using an application network layer if the model is less than a third threshold model size and/or if the latency required for the model transfer is greater than a third threshold latency.

Generally, as noted above, the model updates may be sent by transferring the weights and biases of the model, or gradients of the model matrix, rather than the full model itself.

Turning now to a specific example, in one embodiment, a first UE, UE 1 is connected to frequency 1 on a first node, Node-1, while second and third UEs (UE 2 and UE 3) are connected to frequency 2 on a second node, Node-2. In this example, node-1 is interested in offloading the connected UE 1 to frequency 2. Node 2 can build a model of the location to signal strength mapping using its connected UEs with the proposed federated learning framework using methods 300 and 400 as described above. In this embodiment, in block 302, Node-2 signals the model comprising a neural network with initial weights and an indication that the UE 2 and UE 3 should use location as input features, and the signal strength on frequency 2 as output feature when training the model. Next, according to blocks 402 and 404, UE 2 and UE 3 train the received model to predict signal strength from the location, using N collected samples (N could be a number signalled by Node 2, or predefined). After N samples, where each sample consists of a location and signal strength measurement, UE 2 and UE 3 transmit the outcome of the training of the local copies of the models 406 to Node 2, which updates the model (e.g. the global or central copy of the model) 306. If in this example, Node-2 requires at least 10N samples for a desired accuracy, the process described above may be performed 5 times (sending/receiving model updates to the two UEs).

Next, after the (global) model is trained with 10 N samples, UE 1's serving node, Node-1 may perform method 200. Node-1 may send 202 a first message to UE 1 comprising instructions to create a local copy of the trained model. Node-1 can receive the model for example via signalling between Node-1 and Node-2 via X2 interface, or via some central node, and uses the model to evaluate the signal strength on frequency 2 based on its location. In this embodiment, UE 1 is also configured with a reporting criterion, that it should trigger a report when the model's predicted signal strength on frequency 2 is above a certain threshold. This ensures UE 1 reports only when it is in coverage of Node-2. After Node-1 receives a message 202 indicating that the signal strength is above the threshold, it can determine 206 that the UE should handover and initiate an inter-frequency handover to frequency 2.

Turning now to a second example, in the training phase, UE 1 (and other UEs connected to Node-1) may be configured to perform inter-frequency measurements to build a model between the location and the signal strength on frequency 2. The advantage in building a mapping from location to Node-2 signal strength in Node-1 is that the models do not need to be sent/signalled between Node-2 and Node-1.

In another example related to the model output, a UE with two receiver chains can be connected to frequency 1 and 2 simultaneously, this enables training that finds the strongest carrier in each location. In the execution phase, this would allow another UE with a single receiver chain to predict the best frequency at each location and thereby be served by the best frequency.

Figure 5:
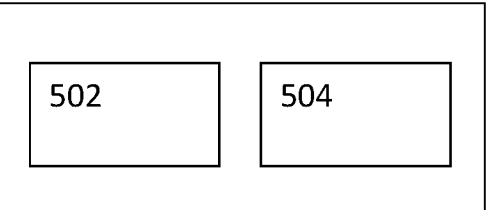
FIG. 5 shows an example node according to some embodiments.

Turning now to other embodiments, as illustrated in FIG. 5, in some embodiments there is a network node 500 in a communications network according to some embodiments herein. The node 500 is configured (e.g. adapted or programmed) to perform any of the embodiments of the method 200 and/or the method 300 as described above.

Generally, the node 500 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 500 may be configured or operative to perform the methods and functions described herein, such as the methods 200 or 300 as described above. The node 500 may comprise processing circuitry (or logic) 502. It will be appreciated that the node 500 may comprise one or more virtual machines running different software and/or processes. The node 500 may therefore comprise one or more servers, switches and/or storage devices and/or may comprise cloud computing infrastructure or infrastructure configured to perform in a distributed manner, that runs the software and/or processes.

The processor 502 may control the operation of the node 500 in the manner described herein. The processor 502 can comprise one or more processors, processing units, multi-core processors or modules that are configured or programmed to control the node 500 in the manner described herein. In particular implementations, the processor 502 can comprise a plurality of software and/or hardware modules that are each configured to perform, or are for performing, individual or multiple steps of the functionality of the node 500 as described herein.

The node 500 may comprise a memory 504. In some embodiments, the memory 504 of the node 500 can be configured to store program code or instructions that can be executed by the processor 502 of the node 500 to perform the functionality described herein. Alternatively or in addition, the memory 504 of the node 500, can be configured to store any requests, resources, information, data, signals, or similar that are described herein. The processor 502 of the node 500 may be configured to control the memory 504 of the node 500 to store any requests, resources, information, data, signals, or similar that are described herein.

It will be appreciated that the node 500 may comprise other components in addition or alternatively to those indicated in FIG. 5. For example, in some embodiments, the node 500 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 502 of node 500 may be configured to control such a communications interface to transmit to and/or receive from other nodes or network functions requests, resources, information, data, signals, or similar.

Briefly, in one embodiment, the node 500 may be configured to send a first message to a UE, the message instructing the UE to create a local copy of a model, the model having been trained using a machine learning process to predict conditions on the second network node in the communications network based on location of the UE; receive a second message from the UE, comprising a prediction of conditions on the second network node at the location of the UE, the prediction of conditions having been obtained using the model; and determine whether the UE should handover to the second network node, based on the received predicted conditions.

Sending a first message to a UE, receiving a second message from the UE and determine whether the UE should handover to the second network node were all described in detail with respect to method 200 and FIG. 2 above and the detail therein will be appreciated to apply equally to embodiments of the node 500.

In another embodiment, the node 500 may be configured to send a fifth message to a User Equipment, UE, the fifth message instructing the UE to create a local copy of the model and train the local copy of the model using training data available to the UE, wherein the training data comprises i) example inputs comprising indications of locations of the UE and ii) for each example input a corresponding example output comprising a ground truth condition on each of the one or more network nodes at the respective indicated input location as measured by the UE; receive a sixth message from the UE indicating an outcome of the training of the local copy of the model; and update the model based on the indicated outcome of the training of the local copy of the model.

Sending a fifth message to a User Equipment, instructing the UE to create a local copy of the model and train the local copy of the model using training data available to the UE, receiving a sixth message from the UE indicating an outcome of the training of the local copy of the model and updating the model based on the indicated outcome of the training of the local copy of the model were described in detail above with respect to the method 300 and the detail therein will be appreciated to apply equally to embodiments of the node 500.

Figure 6:
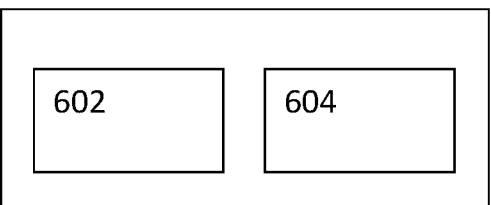
FIG. 6 shows an example UE according to some embodiments.

Turning now to FIG. 6, in some embodiments there is a user equipment 600, comprising a processor 602 and a memory 604. In some embodiments, the memory 604 contains instructions executable by the processor 602, and the set of instructions, when executed by the processor, cause the processor to: provide a location of the UE as input to a model stored on the UE, the model having been trained using a machine learning process to predict conditions on the second network node in the communications network based on the location of the UE; receive from the model a prediction of conditions on the second network node at the provided location of the UE; and use the received predicted conditions to determine whether to perform a handover procedure to the second network node.

Providing a location of the UE as input to a model stored on the UE, the model having been trained using a machine learning process to predict conditions on the second network node in the communications network based on the location of the UE; receiving from the model a prediction of conditions on the second network node at the provided location of the UE; and using the received predicted conditions to determine whether to perform a handover procedure to the second network node were all described in detail with respect to FIG. 1 and the method 100 and the detail therein will be understood to apply equally to embodiments of the UE 600.

In some embodiments (additionally or alternatively), the set of instructions, when executed by the processor, cause the processor to: receive a fifth message from a node in the communications network, the fifth message instructing the UE to create a local copy of the model and train the local copy of the model using training data available to the UE, wherein the training data comprises i) example inputs comprising indications of locations of the UE and ii) for each example input a corresponding example output comprising a ground truth condition on each of the one or more nodes at the respective indicated input location as measured by the UE; train the local copy of the model according to the received fifth message; and send a sixth message to the node indicating an outcome of the training of the local copy of the model, such that the node may update a central version of the model, based on the training of the local copy.

Receiving a fifth message from a node, training a local copy of the model and sending a sixth message were described above with respect to method 400 and the detail therein will be appreciated to apply equally to embodiments of the user equipment 600.

In more detail, the UE 600 may comprise a device capable, configured, arranged and/or operable to communicate wirelessly with network nodes and/or other wireless devices. Unless otherwise noted, the term UE may be used interchangeably herein with wireless device (WD). Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the network.

Examples of a UE 600 include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A UE may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as an MTC device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE 700 as described above may represent the endpoint of a wireless connection, in which case the device may be referred to as a wireless terminal. Furthermore, a UE as described above may be mobile, in which case it may also be referred to as a mobile device or a mobile terminal.

The UE 600 may be configured or operative to perform the methods and functions described herein, such as the methods 100 or 400 as described above. The UE 600 may comprise processor (or logic) 602. It will be appreciated that the UE 600 may comprise one or more virtual machines running different software and/or processes. The UE 600 may therefore comprise one or more servers, switches and/or storage devices and/or may comprise cloud computing infrastructure or infrastructure configured to perform in a distributed manner that runs the software and/or processes.

The processor 602 may control the operation of the UE 600 in the manner described herein. The processor 602 can comprise one or more processors, processing units, multi-core processors or modules that are configured or programmed to control the UE 600 in the manner described herein. In particular implementations, the processor 602 can comprise a plurality of software and/or hardware modules that are each configured to perform, or are for performing, individual or multiple steps of the functionality of the UE 600 as described herein.

The UE 600 may comprise a memory 604. In some embodiments, the memory 604 of the UE 600 can be configured to store program code or instructions that can be executed by the processor 602 of the UE 600 to perform the functionality described herein. Alternatively or in addition, the memory 604 of the UE 600, can be configured to store any requests, resources, information, data, signals, or similar that are described herein. The processor 602 of the UE 600 may be configured to control the memory 604 of the UE 600 to store any requests, resources, information, data, signals, or similar that are described herein.

It will be appreciated that the UE 600 may comprise other components in addition or alternatively to those indicated in FIG. 6. For example, the UE 600 may comprise a communications interface. The communications interface may be for use in communicating with other UEs and/or nodes in the communications network, (e.g. such as other physical or virtual nodes such as the node 500 described above). For example, the communications interface may be configured to transmit to and/or receive from nodes or network functions requests, resources, information, data, signals, or similar. The processor 602 of UE 600 may be configured to control such a communications interface to transmit to and/or receive from nodes or network functions requests, resources, information, data, signals, or similar.

Turning to other embodiments, there is provided a computer program product comprising a computer readable medium, the computer readable medium having computer readable code embodied therein, the computer readable code being configured such that, on execution by a suitable computer or processor, the computer or processor is caused to perform the method or methods described herein.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method in a user equipment (UE) for determining whether to perform a handover procedure from a first network node to a second network node, the method comprising:

the UE obtaining the current location of the UE;

the UE providing the current location of the UE as input to a model stored on the UE, the model having been trained using a machine learning process to predict conditions on the second network node in the communications network based on the input current location of the UE;

the UE obtaining from the model at least a first prediction of a first condition on the second network node at the provided current location of the UE; and the UE using the first prediction of the first condition to determine whether to perform a handover procedure to the second network node.

2. The method of claim 1, wherein the model was trained using a federated machine learning process.

3. The method of claim 1, wherein the step of using the received predicted conditions to determine whether to perform a handover comprises: sending a second message comprising the received predicted conditions to a node in the communications network for use by the node in determining whether the UE should perform a handover procedure to the second network node.

4. The method of claim 3, further comprising comparing the received predicted conditions on the second network node to a reporting condition and wherein the step of sending the second message comprises sending the second message if the received predicted conditions on the second network node satisfy the reporting condition.

5. The method of claim 4, wherein the reporting condition comprises one of:

a threshold and wherein the reporting condition is satisfied if the received predicted conditions change from being below the threshold to above the threshold, or if the received predicted conditions change from being above the threshold to below the threshold;

a threshold signal strength on the second network node and wherein the reporting condition is satisfied if the received predicted conditions indicate that the signal strength on the second network node is above the threshold signal strength; and/or a threshold load on the UE and wherein the reporting condition is satisfied if the load on the UE is above the threshold load.

6. The method of claim 1, further comprising performing a handover procedure to the second network node based on the received prediction of the conditions on the second network node at the provided location of the UE.

7. The method of claim 1, wherein the first prediction of the first condition is a prediction of a strength of a signal to be transmitted by the second network node.

8. A method in a node of a communications network of determining whether to instruct a user equipment (UE) to perform a handover procedure from a first network node to a second network node, the method comprising:

sending a first message to a UE, the first message instructing the UE to create a local copy of a model, the model having been trained using a machine learning process to predict conditions on the second network node in the communications network based on the current location of the UE;

receiving from the UE a second message comprising a first prediction of a first condition on the second network node at the current location of the UE, the first prediction of the first condition having been obtained using the model; and determining whether the UE should handover to the second network node, based on the received first prediction of the first condition.

9. The method of claim 8, further comprising sending a third message to the UE instructing the UE to handover to the second network node.

10. The method of claim 8, further comprising: sending a fourth message to the UE, instructing the UE to perform further training on the model according to a federated machine learning procedure.

11. The method of claim 8, wherein the step of sending a first message to the UE comprises sending a configuration of the model to the UE; and wherein the method further comprises:

determining one or more network layers of the communications network over which to send the configuration of the model, based on a size of the model and/or a latency requirement for the model transfer.

12. The method of claim 11, wherein the step of determining one or more network layers comprises:

determining to send the configuration to the UE using all available network layers if the model is greater than a first threshold model size and/or if the latency required for the model transfer is less than a first threshold latency.

13. The method of claim 11, wherein the step of determining one or more network layers comprises:

determining to send the configuration to the UE using a physical, PHY, network layer if the model is less than a second threshold model size and/or if the latency required for the model transfer is less than a second threshold latency.

14. The method of claim 11, wherein the step of determining one or more network layers comprises:

determining to send the configuration to the UE using an application network layer if the model is less than a third threshold model size and/or if the latency required for the model transfer is greater than a third threshold latency.

15. A user equipment (UE), the UE being configured to determine whether to perform a handover procedure from a first network node to a second network, wherein the UE comprises:

a memory comprising instruction data representing a set of instructions; and a processor configured to communicate with the memory and to execute the set of instructions, wherein the set of instructions, when executed by the processor, cause the processor to:

obtain the current location of the UE;

provide the current location of the UE as input to a model stored on the UE, the model having been trained using a machine learning process to predict conditions on the second network node in the communications network based on the input current location of the UE;

obtain from the model at least a first prediction of a first condition on the second network node at the provided current location of the UE; and use the first prediction of the first condition to determine whether to perform a handover procedure to the second network node.

16. A node in a communications network the node being configured to determine whether to instruct a user equipment (UE) to perform a handover procedure from a first network node to a second network node, the node comprising:

a memory comprising instruction data representing a set of instructions; and a processor configured to communicate with the memory and to execute the set of instructions, wherein the set of instructions, when executed by the processor, cause the processor to:

send a first message to a UE, the first message instructing the UE to create a local copy of a model, the model having been trained using a machine learning process to predict conditions on the second network node in the communications network based on location of the UE;

receive from the UE a second message comprising a first prediction of a first condition on the second network node at the current location of the UE, the first prediction of the first condition having been obtained using the model; and determine whether the UE should handover to the second network node, based on the received first prediction of the first condition.

17. A computer program product comprising a computer readable medium, the computer readable medium having computer readable code embodied therein, the computer readable code being configured such that, on execution by a suitable computer or processor, the computer or processor is caused to perform the method of claim 1.

* * * * *